Patented Mar. 26, 1940

2,194,926

UNITED STATES PATENT OFFICE 2,194,926

MONO-NITRO-BENZENE COMPOUND AND THE MANUFACTURE THEREOF

Herbert W. Daudt, Wilmington, Del., and Harold E. Woodward, Penns Grove, N. J., assignors to E. I. du Pont de Nemours & Company, Wilmington, Del., a corporation of Delaware No Drawing. Application December 31, 1937, Serial No. 182,802

4 Claims. (Cl. 260—575)

This invention relates to new benzotrifluoride compounds, and especially to mono-nitro-ortho-amino-benzotrifluoride compounds, to derivatives thereof and to processes of making the same.

The compounds referred to are valuable as dyes and as intermediates for azo dyes. Some of them give good fast dyeings on textile fabrics, especially on cellulose esters and ethers, such as cellulose acetate. The compounds have affinity for cellulose acetate and can be used as dyes and for other purposes.

It is among the objects of the present invention to provide new mono-nitro-ortho-amino-benzotrifluoride compounds and derivatives thereof. Another object of the invention is to provide processes of making the same. Another object of the invention is to provide new intermediates for the production of azo dyes. Another object is to provide new azo dyes. Still other objects of the invention will be understood from the following description.

The objects of the invention are attained in general by ammonolysis of nitro-ortho-halo-benzotrifluorides until the halogen is replaced by amino. Diazonium compounds are made by diazotizing the anilines thus produced and azo compounds are made by coupling with azo dye coupling components.

The invention will be more fully set forth in the following more detailed description which includes examples that are given as illustrative embodiments of the invention and not as limitations thereof.

Example I 30 parts of 5-nitro-2-chloro-benzotrifluoride were added to a solution containing 33 parts of ammonia in 300 parts of ethyl alcohol in a copper lined autoclave. After the addition of 0.5 part of anhydrous cuprous chloride to the mixture, the autoclave was closed and the charge of reactants was heated to 115°–120° C. and maintained in this temperature range for eight hours. The charge was then cooled to about 20° C. and filtered. The filtrate was evaporated to dryness and the residual material was treated with boiling water for approximately 15 minutes. The resulting suspension was cooled to 15–20° C. and was then extracted with ether. The vaporation of the ether left a yellow crystalline mass which, when purified by crystallization from alcohol melted at about 88° C. This product was insoluble in water and consisted essentially of 5-nitro-2-amino-benzotrifluoride which is represented by the formula

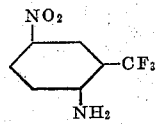

The above product was diazotized by adding it to a solution prepared by dissolving sodium nitrite in sulfuric acid (96%) and stirring until diazotization was attained. The temperature of the reaction medium was 30° C. The diazonium compound was coupled to beta-naphthol in acid medium. The azo compound thus produced was an orange pigment which in full strength and reduced tint gave inks of cleaner tones than the corresponding compound prepared from 2,5-dinitro-aniline. The pigment is represented by the formula

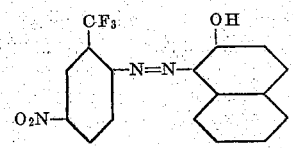

Instead of using 5-nitro-2-chloro-benzotrifluoride as described in Example I, other nitro-2-halo-benzotrifluorides can be used. For example, 3-nitro-2-chloro-benzotrifluoride can be used to produce 3-nitro-2-amino-benzotrifluoride. Nitro-di-(trifluoromethyl)-halo-benzenes can also be converted to the corresponding nitro-di-(trifluoromethyl)-anilines. For example, 4-nitro-2,6 di-(trifluoromethyl)-chlor-benzene and 6-nitro-2,4 di-(trifluoromethyl)-brom-benzene can be converted to 4-nitro-2,6 di-(trifluoromethyl)-aniline and 6-nitro-2,4 di-(trifluoromethyl)-aniline by methods similar to Example I. The properties of the latter products are in general similar to the product of Example I.

The method of ammonolyzing described in the foregoing example may be applied to any 3- or 5-nitro-ortho-halo-benzotrifluoride. The starting compounds may be substituted by any of the halogens. Similar results are obtained by employing as starting compounds, the mono-nitro-ortho-halo-benzotrifluorides which are substituted additionally in the other ortho- or 6-position by one or more than one unreactive groups of the group consisting of alkoxy and trifluoromethyl, and in the 4-position by alkoxy or trifluoromethyl. In the 3 or 5-position that is not substituted by nitro as the case may be, the benzene ring may be substituted by alkoxy, halogen or trifluoromethyl. The additionally substituted ortho-amino-substituted products are diazotizable, the diazo derivatives thus formed couple easily with azo dye coupling components, and the products of coupling are useful dyes. Alkoxy refers to aliphatic ether groups, such as methoxy, ethoxy, propoxy, butoxy and even longer, straight and branched chain aliphatic ether groups, and halogen refers to chlorine, bromine, iodine and fluorine.

The reaction medium or diluent used in the ammonolyses is not necessarily composed of ethyl alcohol since any nonaqueous solvent which is inert to the reactants can be used. As other examples of such media methyl alcohol, ether, chloroform, benzene, toluene and xylene are mentioned, but other solvents which are non-reactive toward the reactants and the products can be used. The catalyst can be omitted when it is desired to ammonolyze at higher temperatures and pressures. Higher pressures than atmospheric can be used with or without the catalyst by introducing ammonia in a closed receptacle which contains the reaction medium and a nitro-halo benzotrifluoride. The process can be carried out satisfactorily within the range 100°–200° C. Without the use of a catalyst the higher temperatures are more satisfactory from considerations of the speed of the reactions since the reaction proceeds more rapidly at higher temperatures. Pressures above atmospheric which are at least equal to the vapor pressure of the ammonia and the solvent at the reaction temperature are used. Closed containers and superatmospheric pressures are advantageous.

The products of ammonolysis of the invention can be used, as dyes and as intermediates for producing azo compounds in substance, such as pigments, or as dyes for textile materials.

Other diazo salts besides the sulfuric acid salt are made by using other non-oxidizing inorganic acids as the diazotizing reaction medium, such as hydrochloric acid. Diazotizing media containing high concentrations of the acid are preferred. The temperatures for diazotization are preferably, but not necessarily, slightly above normal atmospheric temperature. Other details of the procedure for making the diazo salts are understood by those skilled in the art.

In general, the diazo salts obtained from the above trifluoromethyl-anilines couple readily with azo dye coupling components, and any azo dye coupling component can be used. Among such components are the amino and hydroxy substituted derivatives of benzene, naphthalene and quinoline, and straight chain and carbocyclic heterocyclic compounds which contain an active methylene group. As illustrations of other azo dye coupling components are mentioned aniline, its homologues and N-substituted derivatives, phenol and its homologues, m-amino and hydroxy derivatives of benzene; alpha and beta-naphthylamines, alpha and beta-naphthols, amino-naphthols, and the sulfonic acid and carboxylic acid derivatives of said naphthalene compounds; the arylides of hydroxy naphthoic acids, such as the alpha naphthalide of 2-hydroxy-3-naphthoic acid; the acetoacet arylides and their derivatives which contain an active methylene group, such as acetoacet anilide; pyrazolones, such as 1-phenyl-3-methyl-5-pyrazolone and 1-(2'-chloro-5'-sulfophenyl)-5-pyrazolone-3-carboxylic acid ethyl ester; and hydroxy quinolines such as 2-4-di-hydroxy-quinoline and N-methyl-4-hydroxy-2-quinolone.

A solution of the sulfuric acid diazo salt from 5-nitro-2-amino-benzotrifluoride was prepared as described in Example I. Couplings with the following coupling components were made in slightly acid and slightly alkaline media following in other details the procedure described in Example I with the following results:

| Example | Coupling component | Color of azo compound |
| --- | --- | --- |
| 2 | 2-naphthol, 3:6-disulfonic acid | Orange. |
| 3 | H-acid | Bluish red. |
| 4 | Rhoduline acid | Do. |
| 5 | Phenyl-J-acid | Do. |
| 6 | 1-phenyl-3-methyl-5-pyrazolone | Yellow. |
| 7 | Acetoacetanilide | Do. |

Except for differences in color the compounds of Examples 6 and 7 had in general properties similar to the products of coupling of Example I. The products of Examples 2 to 5 were soluble in water and not in organic solvents.

Since from the foregoing description of the invention it will be apparent to those skilled in the art that various other embodiments of the invention may be made without departing from the spirit and scope thereof, it is to be understood that no limitations are intended except those which are specifically recited in the annexed claims or are imposed by the prior art.

We claim:
1. The compounds represented by the formula

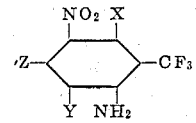

in which X is one of the group consisting of hydrogen, alkoxy and trifluoromethyl; one Y is one of the group consisting of hydrogen, alkoxy, halogen and trifluoromethyl, and Z is one of the group consisting of hydrogen, alkoxy and trifluoromethyl.

2. The compound represented by the formula

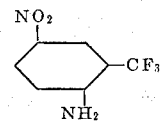

3. The process which comprises heating a mixture of a 5-nitro-ortho-halo-benzotrifluoride, a catalyst, ammonia and a non-reactive non-aqueous organic solvent for said ammonia and benzotrifluoride in a closed container under a superatmospheric pressure which is at least equal to the vapor pressure of ammonia and the medium and at temperatures of 115° to 120° C. until a 5-nitro-ortho-amino-benzotrifluoride is formed.

4. The process which comprises adding ammonia to a solution of 5-nitro-2-chloro-benzotrifluoride in ethyl alcohol which contains copper chloride as a catalyst and heating in a closed container under a superatmospheric pressure which is at least equal to the vapor pressure of ammonia and the medium and at temperatures between 115° to 120° C. until 5-nitro-2-amino-benzotrichloride is formed.

HERBERT W. DAUDT.
HAROLD E. WOODWARD.